(12) United States Patent
Awad et al.

(10) Patent No.: US 8,543,750 B1
(45) Date of Patent: *Sep. 24, 2013

(54) METHOD FOR SHARING A RESOURCE AND CIRCUIT MAKING USE OF SAME

(75) Inventors: Tom Awad, Montreal (CA); Martin Laurence, Montreal (CA); Martin Filteau, Laval (CA); Pascal Gervais, Montreal (CA); Douglas Morrissey, Montreal (CA)

(73) Assignee: Octasic Inc., Montreal, Quebec (CA)

( * ) Notice: Subject to any disclaimer, the term of this patent is extended or adjusted under 35 U.S.C. 154(b) by 932 days.

This patent is subject to a terminal disclaimer.

(21) Appl. No.: 12/579,876

(22) Filed: Oct. 15, 2009

Related U.S. Application Data

(60) Provisional application No. 61/105,520, filed on Oct. 15, 2008, provisional application No. 61/105,675, filed on Oct. 15, 2008.

(51) Int. Cl.
*G06F 13/14* (2006.01)
*G06F 13/42* (2006.01)
*H04L 7/00* (2006.01)

(52) U.S. Cl.
USPC .......................................... 710/242; 713/401

(58) Field of Classification Search
USPC ................. 710/110, 111, 113, 118, 119, 125, 710/240–242, 309; 713/400, 401
See application file for complete search history.

(56) References Cited

U.S. PATENT DOCUMENTS

| | | | |
|---|---|---|---|
| 5,237,696 A * | 8/1993 | Best .............................. | 710/119 |
| 5,467,459 A * | 11/1995 | Alexander et al. ............ | 711/153 |
| 6,064,232 A | 5/2000 | Relph | |
| 6,457,106 B1 * | 9/2002 | Watanabe ..................... | 711/147 |
| 6,882,620 B1 * | 4/2005 | MacLellan et al. ............ | 370/217 |
| 6,928,571 B1 * | 8/2005 | Bonella et al. ................ | 713/401 |
| 7,051,135 B2 * | 5/2006 | Zhu ............................... | 710/116 |
| 7,417,993 B1 | 8/2008 | Ebergen et al. | |
| 7,685,458 B2 * | 3/2010 | Yamaoka ...................... | 713/501 |
| 7,721,291 B2 * | 5/2010 | McKenney ................... | 718/104 |

(Continued)

OTHER PUBLICATIONS

Ostasic, Octasic Announces High Performance Asynchronous DSP Core, "Opus' Clock-Less Architecture Provides Unprecedented Power to Performance Ratios", Press Release, Montreal Quebec, Canada, Oct. 16, 2007.

Mike Stein; "Crossing the abyss: asynchronous signals in a synchronous world", EDN, Jul. 24, 2003, p. 59-69.

(Continued)

*Primary Examiner* — Tim T Vo
*Assistant Examiner* — Trisha Vu
(74) *Attorney, Agent, or Firm* — Ladas & Parry LLP

(57) ABSTRACT

A method is provided for interfacing a plurality of processing components with a shared resource component. A token signal path is provided to allow propagation of a token through the processing components, wherein possession of the token by a given processing component enables the latter to conduct a transaction with the shared resource component. Token processing logic is also provided for propagating the token from one processing component to another along the token signal path, the propagating being done at a propagation rate that is related to a transaction rate associated with the shared resource component. The token processing logic also generates a trigger signal at least in part based on the token and propagates to trigger signal to the shared resource component to convey initiation of a transaction with the shared resource component. A circuit comprising a plurality of processing components and a shared resource component is provided wherein the plurality processing components and the shared resource components are interfaced with one another using the method proposed.

22 Claims, 15 Drawing Sheets

(56) References Cited

U.S. PATENT DOCUMENTS

| | | | |
|---|---|---|---|
| 8,130,019 B1* | 3/2012 | Awad et al. | 327/291 |
| 8,180,941 B2* | 5/2012 | Chen et al. | 710/241 |
| 8,181,056 B2* | 5/2012 | Oh | 713/401 |
| 2005/0015637 A1* | 1/2005 | Van Eijndhoven et al. | 713/400 |
| 2006/0271805 A1* | 11/2006 | Pearce et al. | 713/401 |
| 2008/0215786 A1* | 9/2008 | Goossens et al. | 710/243 |

OTHER PUBLICATIONS

USPTO OA mailed Feb. 10, 2011 in connection with U.S. Appl. No. 12/579,560.

USPTO NOA mailed Nov. 16, 2011 in connection with U.S. Appl. No. 12/579,560.

USPTO NFOA dated Jun. 3, 2013 in connection with U.S. Appl. No. 12/579,908.

* cited by examiner

METHOD FOR SHARING A RESOURCE AND CIRCUIT MAKING USE OF SAME

CROSS-REFERENCE TO RELATED APPLICATIONS

The present application claims the benefit of priority under 35 USC §119 e) based on:
U.S. provisional patent application Ser. No. 61/105,520 filed on Oct. 15, 2008 by T. Awad et al.; and
U.S. provisional patent application Ser. No. 61/105,675 filed on Oct. 15, 2008 by T. Awad et al.
The contents of the aforementioned documents are incorporated herein by reference.

FIELD OF THE INVENTION

The present invention relates generally to the field of semiconductors, and, more specifically, to a method for use in IC, ASIC, FPGA designs for sharing self-timed resources between processing modules.

BACKGROUND

Asynchronous systems—much like object-oriented software—are typically constructed out of modular 'hardware objects', each with well-defined communication interfaces. For example, in the design of processing cores, it is often common to combine several processing components and to interface these components with shared resources. Examples of the type of resources that can be shared between processing components include for example instruction (cache) memory, data (cache) memory and advanced computation components (e.g. floating point computation units). The interfacing between modules creates challenges in the sense that setup and hold violation, metastability and unreliable data transfers may occur since the components of the system are independently designed.

A first approach for interfacing components is commonly referred to as the handshaking protocol. A simple channel used to perform handshaking between two components typically consists of two wires: a request wire and an acknowledge wire. Different variations of the handshaking approach have been suggested, all requiring some type of exchange of request and acknowledgement messages between the components being interfaced in order to complete a transaction between these components. Handshaking approaches are well-known in the art and as such will not be described in further detail here.

A deficiency with the use of handshaking approaches for synchronization purposes is that they incur delays over and above the time required to complete a transaction between two components.

A second approach for interfacing systems is the use of an asynchronous first-in-first-out (FIFO) approach. FIFOs are used commonly in electronic circuits for buffering and flow control. In hardware form, a FIFO primarily consists of a set of read and write pointers, storage and control logic. Storage may be SRAM, flip-flops, latches or any other suitable form of storage. An asynchronous FIFO has two interfaces, one for writing the data into the FIFO and the other for reading the data out and makes use of different signals for reading and writing. Asynchronous FIFO approaches are well-known in the art and as such will not be describe in further detail here.

A deficiency with the use of asynchronous FIFO approaches for synchronization purposes is that they require significant additional system resources for both the implementation of the FIFO itself as well as for the various control signals used for reading from and writing to the FIFO and to indicate the full/empty state of the FIFO.

Difficulties associated with interfacing components using either a handshaking approach or a FIFO approach are compounded in circumstance where "resource" components (or "slave" components) are shared amongst several "processing" components (or "master" components).

In the context of the above, there is a need to provide a method and associated circuit for interfacing components that alleviates at least in part problems associated with existing approaches.

SUMMARY

In accordance with a broad aspect, the invention provides a method for interfacing a plurality of processing components with a shared resource component. The method comprises providing a token signal path to allow propagation of a token through the processing components in the plurality of processing components, wherein possession of the token by a given processing component enables the given processing component to conduct a transaction with the shared resource component. The method also comprises propagating the token from one processing component to another processing component along the token signal path. The method also comprises generating a trigger signal at least in part based on the token and propagating the trigger signal to the shared resource component, wherein the trigger signal conveys initiation of a transaction with the shared resource component.

In accordance with a specific example of implementation, the trigger signal is used for generating a clock signal for use by the shared resource component to receive and process the transaction.

In accordance with a specific example of implementation, the propagating of the token is done at a propagation rate that is related to a transaction rate associated with the shared resource component.

In a specific example, the transaction rate is a transaction acceptance rate associated with the resource component, the transaction acceptance rate being indicative of a rate at which the resource component can accept transaction requests.

In another specific example, the transaction rate is a transaction completion rate associated with the resource component. The transaction completion rate may be indicative of a rate at which the resource component can complete a transaction specified in the transaction request originating from a processing component or, alternatively, may be indicative of a rate at which the resource component can issue a reply to a transaction request originating from a processing component.

In a specific example of implementation, the shared resource component may be any suitable component, including, without being limited to, an instruction (cache) memory, a data (cache) memory and an advanced computation component.

In a specific example of implementation, the lack of possession of the token by the given processing component prevents the given processing component from conducting a transaction with the shared resource component. In addition, only one processing component in the plurality of processing components may posses the token at any given time. In this manner, the token allows preventing more than one processing component from initiating a transaction with the resource component at a given time.

In accordance with a first specific example of implementation, the propagation rate of the token from the one processing component to another processing component is at most equal to the transaction rate associated with the shared resource component.

In accordance with a second specific example of implementation, propagating the token from the one processing component to another processing component along the token signal path comprises:

i. determining if the one processing component desires a transaction with the shared resource component;

ii. if the one processing component desires a transaction with the shared resource component:

(a) retaining the token while the processing component initiates the transaction with the shared resource component; and (b) after a transaction delay time has elapsed, releasing the token so that it is propagated along the token signal path to another processing component, wherein the transaction delay time is related to the transaction rate associated with the shared resource component;

iii. if the one processing component desires no transaction with the shared resource component, releasing the token so that it is propagated along the token signal path to another processing component.

In particular, according to the second specific example of implementation, if the processing component holding the token does not need to use the shared resource component, the token can be passed along the token signal path without having to wait for the transaction delay time to elapse thereby improving the efficiency of use of the resource component. In other words, if the processing component holding the token does not need to use the shared resource component, the token can be propagated with no or with minimal delay.

Advantageously, in this second specific example of implementation, delays associated with propagating the token along the token signal path are reduced when the resource component is not needed by the one processing component in a set of processing components.

In specific examples of implementation, the duration of the transaction delay time may be pre-determined or variable. For example, the transaction delay time may be dependent upon the specific type of transaction being conducted between the processing component and the shared resource.

In a specific example of implementation, propagating the token from one processing component to another processing component along the token signal path includes causing a signal transition on a portion of the token signal path between the one processing component and another processing component. The signal transition may be a transition from a LOW to a HI signal (rising edge) or a HI to LOW signal (falling edge). Alternatively, the signal transition may be a clock pulse.

In accordance with another broad aspect, the invention provides a circuit comprising a plurality of processing components, a resource component shared between the plurality of processing components, a token signal path and token processing logic. The token signal path allows propagation of a token through the processing components in the plurality of processing components, wherein possession of the token by a given processing component enables the given processing component to conduct a transaction with the shared resource component. The token processing logic is for propagating the token from one processing component to another processing component along the token signal path. The token processing logic also generates a trigger signal at least in part based on the token, wherein the trigger signal conveys initiation of a transaction with the shared resource component, and for propagating the trigger signal to the shared resource component.

It is to be appreciated that, in specific implementations, there may be multiple resource components shared by multiple processing components, where each resource component may be associated with a respective token and token signal path. In such specific implementations, the token signal paths and tokens may be independent of one another.

Similarly, it is to be appreciated that, in specific implementations, a resource component may itself be a processing component in that it makes use of other shared resources to perform its resource service to a requesting processing component.

These and other aspects and features of the present invention will now become apparent to those of ordinary skill in the art upon review of the following description of specific embodiments of the invention in conjunction with the accompanying drawings.

Other aspects and features of the present invention will become apparent to those ordinarily skilled in the art upon review of the following description of specific embodiments of the invention in conjunction with the accompanying figures.

DETAILED DESCRIPTION

Examples of implementations will now be described with reference to the figures. For the purpose of simplicity, components and processes not necessary to convey the principles of the invention have been omitted from the figures. The person skilled in the art will readily appreciate that practical implementations making use of the concepts presented in the present description will include several other components and implement several other processes and that the inclusion of such components and processes in variants of the invention does not detract from its spirit. Since such components and processes are not necessary for the understanding of the present invention, they will not be described in further detail in the present document.

Figure 1:
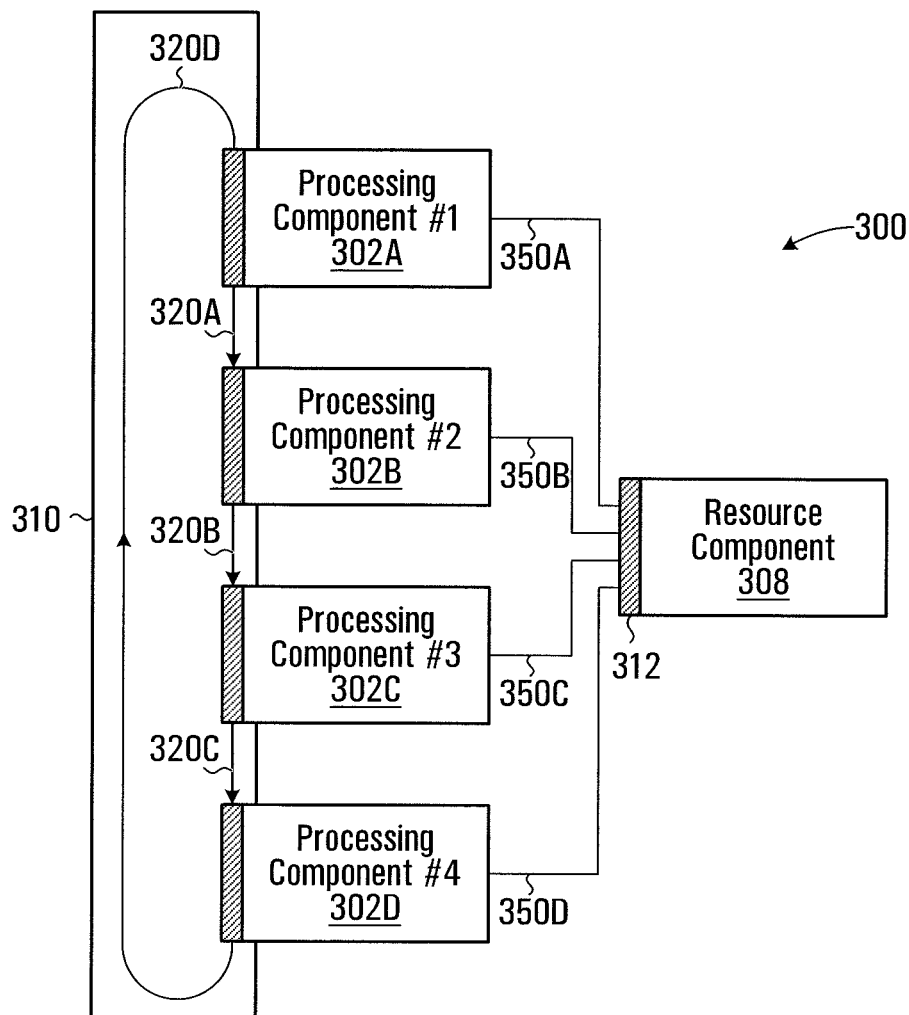
FIG. 1 shows a block diagram of an exemplary circuit in accordance with a specific example of implementation of the present invention.

With reference to FIG. 1, there is shown a block diagram of a circuit 300 in accordance with a specific example of implementation of the present invention. As depicted, the circuit 300 includes a plurality of processing components 302A-D and at least one resource component 308 shared between the processing components 302A-D. The circuit 300 also includes a token signal path 310 and token processing logic (not shown in FIG. 1).

The resource component 308 includes a resource interface 312. The resource component 308 may be designed as an asynchronous circuit or may operate according to a resource clock having a resource clock frequency. The resource component 308 includes the required circuitry for conducting transactions with other components in circuit 300 including transactions with processing components 302A-D. In a specific example of implementation, the resource interface 312 includes the required circuitry for receiving transaction requests originating from processing components 302A-D and transmitted over data paths 350A-D. The rate at which the resource interface 312 can accept the transaction requests, herein referred to as the transaction acceptance rate associated with the resource component, is generally directed by the resource component's maximum frequency of access. More specifically, there is an upper limit for the rate at which the resource interface 312 can accept signals at resource interface 312 without causing corruption in the data paths internal to the resource component 308. Manners in which a component's maximum frequency of access can be determined are well know in the art and as such will not be described further here. When appropriate, the resource component 308 includes the required circuitry for transmitting signals directed to the processing components 302A-D either over data paths 350A-D or over alternate return data paths (not shown in the figures). Amongst other, the signals directed to the processing components 302A-D may be generated in reply to transaction requests received at the resource interface 312.

In specific embodiments of the invention, different types of transactions may be contemplated between the processing components 302A-D and the shared resource component 308.

A first type of transaction includes transmission of a transaction request originating from one of processing components 302A-D and directed to the shared resource component 308, wherein the transaction request does not require the generation of a reply by the shared resource component 308 in response to the transaction request. A transaction request may include, without being limited to, a transmission of an instruction and/or data to the resource component 308. In a non-limiting example, in a situation where the shared resource component 308 is a memory module, a transaction of the type described may be a "DATA WRITE" request whereby no reply to the request is expected by the processing component. For this first type of transaction, the transaction may be considered as being complete when the shared resource component 308 has received the transaction request even though the shared resource component 308 may continue the execution of the function after reception of the transaction request. In such a case, the transaction completion rate is substantially the same as the transaction acceptance rate associated with the resource component 308. In alternative embodiments, the transaction may be considered as being complete when the shared resource component 308 has completed the execution of the function requested by the transaction request.

A second type of transaction includes the transmission of a transaction request from one of processing components 302A-D to the shared resource component 308, wherein the transaction request requires the generation of a reply by the shared resource component 308 in response to the transaction request. In a non-limiting example, in a situation where the shared resource component 308 is a memory module, a transaction of the type described may be a "DATA READ" request whereby a reply to the request in the form of a transmission of data is expected by the processing component. For this second type of transaction, the transaction may be considered as being complete when either the shared resource component issues the reply in response to the transaction request or, alternatively, when the processing component that originated the transaction request receives the reply. It is to be appreciated that the delay between reception of a transaction request and release of a reply may depend on the circuitry of the resource component 308 and may vary from one transaction to the next and may therefore depend on the specific transaction requested by the transaction request sent from one of processing components 302A-D.

A third type of transaction includes multiple signal exchanges between one of processing components 302A-D and the resource component 308. For this third type of transaction, the transaction may be considered as being complete when the multiple signal exchanges between a given processing component and the resource component 308 have been completed. For the purpose of simplicity, this third type of transaction will not be further described in the present description.

Examples of the type of resources that can be used as resource component 308 include instruction (cache) memory, data (cache) memory and advanced computation components (e.g. floating point computation units). It will be appreciated that the aforementioned list of resource components was presented here for the purpose of illustration only and that several other different types of resources may be used here. The specific circuitry used by the resource component 308 for conducting a transaction with the processing components 302A-D is not critical to the invention and as such will not be described in further detail here.

Processing components 302A-D include suitable circuitry for implementing a desired functionality. In a first example of implementation, the processing components 302A-D are identical in design and function to one another. In a non-limiting example of implementation, the processing components 302A-D implement arithmetic and logic units (ALU). In a second example of implementation, the processing components 302A-D implement different functionality from one another. The processing components 302A-D may be designed as "clocked" device and operate in accordance with a common clock or with respective individual clock. Alternatively, the processing components 302A-D may be designed as asynchronous units. Each one of processing component 302A-D also includes the required circuitry for conducting a transaction with the resource component 308 through resource interface 312. The specific functionality implemented by each of processing components 302A-D as well as the specific circuitry used for conducting a transaction with the resource component 308 are not critical to the invention and as such will not be described in further detail here. When performing a transaction with the resource component 308, the processing components 302A-D transmit signals to the resource component 308 over respective data paths 350A-D and may also receive signals from resource component 308 over the same data paths 350A-D or over alternate returns paths (not shown in the figures). In the embodiment depicted in FIG. 1, each processing component has a dedicated data path between itself and resource component 308. It will however be appreciated that, in alternative implementation, the processing components 302A-D may share a common data path (or share portions of the data path) between themselves and the resource component 308.

The token signal path 310 allows propagation of a token through the processing components 302A-D. The token signal path may be implemented using any suitable signal carrying medium and components allowing propagating a signal between different components. In the example illustrated, the token signal path 310 includes a plurality of portions 320A-D linking the processing components 302A-D so that the token may be passed amongst them.

The token is such that only one processing component amongst processing components 302A-D can posses it at any given time. In a specific example of implementation, possession of the token by a given processing component enables the given processing component to initiate a transaction with the shared resource component 308 via the resource interface 312. Conversely, lack of possession of the token by the given processing component prevents the given processing component from initiating a transaction with the shared resource component 308 via the resource interface 312. In this manner, the token allows preventing more than one processing component from initiating a transaction with the resource component 308 at a given time or at a rate that exceeds the shared resource's ability to process transactions.

In a specific example of implementation, the token can be used for the dual purpose of granting access to the shared resource component 308 and synchronizing the communication between each of the processing components 302A-D and the resource component 308. It will however be appreciated that different mechanisms can be used for granting access to the shared resource component 308 and that it is not a requirement for the same token to be used to achieve both the synchronizing purpose and the access grant purpose.

Token processing logic is provided for propagating the token from one processing component to other processing components amongst processing components 302A-D along the token signal path 310. In particular, the token processing logic propagates the token between the processing components 302A-D at a propagation rate that is related to the transaction rate of the resource component 308. In a first specific example, the transaction rate is the transaction acceptance rate associated with the resource component 308, the transaction acceptance rate being indicative of a rate at which the resource component can accept transaction requests. In a second specific example, the transaction rate is the transaction completion rate associated with the resource component 308. The transaction completion rate may be indicative of the rate at which the resource component 308 can issue a reply to a transaction request originating from one of processing components 302A-D or alternatively the rate at which one of processing components 302A-D would receive a reply following the transmission of a transaction request to the resource component 308. In certain, the transaction rate may depend upon the specific transaction being conducted between the processing component the resource component 308.

Examples of processes that may be implemented by the token processing logic in the context of the circuit shown in FIG. 1 will be now be described in greater detail.

Figure 2:
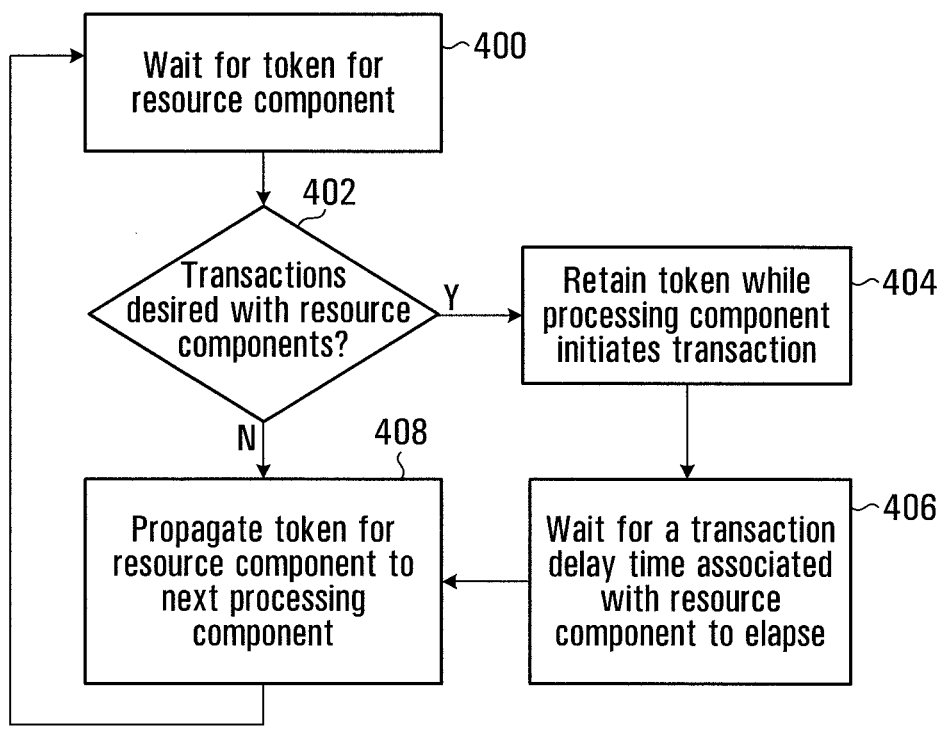
FIG. 2 shows a flow diagram of a process implemented by token processing logic for use in connection with the circuit depicted in FIG. 1 in accordance with a specific example of implementation of the present invention.

With reference to FIG. 2, there is a shown a flow diagram of a process in accordance with a specific example of implementation of the present invention. The process depicted is implemented by token processing logic associated with a given processing component amongst processing components 302A-D. For the purpose of illustration, the process depicted in FIG. 2 will be described with reference to processing component 302A (shown in FIG. 1). It will be readily apparent to the person skilled in the art that the same process may be used in connection with each of processing components 302A-D in order to propagate the token associated with resource component 308 through the token signal path 310 (also shown in FIG. 1).

At step 400, processing component 302A waits for the token associated with resource component 308. In a non-limiting example of implementation, processing component 302A monitors portion 320D of the token signal path 310 to detect the reception of the token. The reception of the token may be conveyed in different manners including, but not limited to, a signal transition or the presence of a pulse on portion 320D of the token signal path 310. The signal transition may be a transition from a LOW to a HI signal (rising edge) or a HI to LOW signal (falling edge). The token processing logic may include any suitable circuitry for detecting the reception of the token. Once the token has been received, the token processing logic proceeds to step 402.

At step 402, the token processing logic determines whether processing component 302A requires a transaction with resource component 308. In other words, the token processing logic determines whether processing component 302A needs the services provided by resource component 308. The token processing logic may include any suitable circuitry for determining whether processing component 302A desires to effect a transaction with resource component 308. If processing component 302A does not require a transaction with resource component 308, step 402 is answered in the negative and the token processing logic proceeds to step 408. Conversely, if processing component 302A does require a transaction with resource component 308, step 402 is answered in the affirmative and the token processing logic proceeds to step 404. For example, if processing component 302A needs to store data and resource component 308 is a memory module, then the question asked at step 402 would be answered in the affirmative and the process would proceed to step 404. Conversely, if processing component 302A does not require any data to be stored in the resource component 308, then the question asked at step 402 would be answered in the negative and the process would proceed to step 408.

Optionally, if at step 402 the token processing logic is not ready to make a determination as to whether or not processing component 302A requires a transaction with resource component 308, the process remains at step 402 until such a determination is completed. In such an implementation, the token processing logic retains the token until it is in a position to make the determination of whether or not processing component 302A requires a transaction with resource component 308.

At step 404, which is initiated when processing component 302A wishes to conduct a transaction with resource component 308, the token processing logic retains the token while the processing component 302A initiates the desired transaction. The token processing logic may include any suitable circuitry for retaining the token. It is to be appreciated that the desired transaction may be any suitable transaction between the processing component 302A and the resource component 308 and that the precise nature of the transaction is not critical to the invention. When conducting a transaction, the processing component 302A transmits signals in the form of transaction requests, which may include data and/or instructions, to resource component 308 over data path 350A. Once the processing component 302A has initiated the desired transaction, the token processing logic proceeds to step 406.

At step 406, the token processing logic waits for a transaction delay time associated with the resource component 308 to elapse. The token processing logic may include any suitable circuitry for retaining the token for the duration of the transaction delay time. The transaction delay time, which is related to the transaction rate associated with the resource component 308, may have a pre-determined duration (fixed duration) or a variable duration.

In a first specific example, waiting for the transaction delay time to elapse at step 406 is intended to allow the resource interface 312 to have sufficient time to accept the signals transmitted by the processing component 302A over data path 350A before another processing component in the set of components 302A-D initiates a new transaction. In this first example, the transaction rate is a transaction acceptance rate associated with the resource component 308, the transaction acceptance rate being indicative of a rate at which the resource component 308 can accept transaction requests. In a specific example, in circumstances in which the processing component 302A conducts a transaction with the resource component 308, the duration of the transaction delay time is selected such that token is propagated from processing component 302A to another processing component as a rate no faster than the transaction acceptance rate associated with the resource component 308. Advantageously, this allows the resource interface 312 to have sufficient time to accept the signals transmitted by the processing component 302A over data path 350A before another processing component in the set of components 302A-D initiates a new transaction. In a non-limiting example in which the resource interface 312 operates in accordance with a resource clock, the duration of the transaction delay time is set to be at least as long in duration as a clock cycle of the resource clock used to direct the resource interface 312.

In a second specific example, the duration of the transaction delay time is intended to allow the resource component 308 to have sufficient time to complete the transaction initiated by the processing component at step 404 before another processing component in the set of components 302A-D initiates a new transaction. In this second example, the duration of the transaction delay time is related to a transaction completion rate associated with the resource component 308. The transaction completion rate may be indicative of the rate at which the resource component 308 can complete a transaction specified in the transaction request originating from a processing component or, alternatively, may be indicative of a rate at which the resource component can issue a reply to a transaction request originating from a processing component. In a specific example, in circumstances in which the processing component 302 conducts a transaction with the resource component 308, the duration of the transaction delay time is selected such that token is propagated from processing component 302A to another processing component as a rate no faster than the transaction completion rate associated with the resource component 308. In specific implementations where the transaction completion rate associated with the resource component 308 can be determined, the duration of the transaction delay time can be set to a pre-determined duration. In a non-limiting example of implementation, the duration of the transaction delay time is set to be at least as long as the longest delay for completing a transaction by the resource component 308.

It will be appreciated that, in certain embodiments, the rate at which the resource component completes a transaction may vary depending on the specific transaction requested. In alternative embodiments, the duration of the transaction delay time can be set to different time durations wherein each time duration is associated with a respective specific transaction request. As such, it is to be appreciated that, in such alternative embodiments of the invention, the duration of the transaction delay time can be set dynamically while the circuit is operating on the basis of the transaction requested by processing component 302A.

Once the transaction delay time has elapsed, the token processing logic proceeds to step 408.

At step 408, which is initiated after step 402 when processing component 302A does not wish to conduct a transaction with resource component 308 or after step 406 when the transaction delay time has elapsed after processing component 302A has conducted a transaction with the resource component 308, the token processing logic releases the token so that it is propagated along the token signal path 310 to another processing component. In a specific example of implementation, the token processing logic releases the token so that it is propagated to processing component 302B. The release of the token may be conveyed in different manners including, but not limited to, a signal transition or the presence of a pulse on portion 320A of the token signal path 310. In a non-limiting example of implementation, processing component 302A causes a signal transition on portion 320A of the token signal path 310. The signal transition may be a transition from a LOW to a HI signal (rising edge) or a HI to LOW signal (falling edge). Once the token has been released the token processing logic returns to step 400 where processing component 302A resumes waiting for the token associated with resource component 308.

As will be observed, in the embodiment described with reference to FIGS. 1 and 2, the token being propagated through the processing components 302A-D over the token signal path 310 serves the dual purpose of granting access to the resource component 308 and of synchronizing the communication between the processing components 302A-D and the resource component 308. In particular, by waiting for a transaction delay time to elapse (step 406 in FIG. 2) before propagating the token, where the transaction delay time is related to the transaction rate associated with the resource component 308 (shown in FIG. 1), the token processing logic ensures that the resource interface 312 is ready to accept a new transaction request by the time another processing component receives the token. Hence, when a processing component receives a token, it can immediately initiate a transaction if desired without having to perform any synchronization operation since the resource interface 312 should be ready to accept a new transaction request.

In addition, as can be observed, if processing component 302A does not need to use the resource component (which corresponds to condition 402 being answered in the negative), the token can be propagated by the token processing logic at step 408 along the token signal path 310 without having to wait for the transaction delay time to elapse thereby improving the efficiency of use of the resource component 308. Advantageously, this reduces delays associated with propagating the token along the token signal path when the resource component is not needed by a processing component. Consequently, in circumstances where not all processing components 302A-D are desirous of conducting transactions with resource component 308, the token can be propagated through the processing components 302A-D at a rate that exceeds the transaction rate of the resource component 308. It will be appreciated that, in variants of the invention, the token processing logic may wait for the transaction delay time to elapse before propagating the token from a given processing component to another processing component regardless of whether the given processing component conducts a transaction with the resource component. In such implementations, step 402 shown in FIG. 2 would be omitted and the process would proceed directly from step 400 to step 404 and step 408 would be performed after completion of step 406. As will be appreciated by the person skilled in the art in light of the present description, by propagating the token at a rate no faster than the transaction rate of the resource component 308, the token can continue to serve the dual purpose of granting access to the resource and of synchronizing the communication between the processing components and the resource component.

Those skilled in the art should appreciate that in some embodiments, all or part of the circuit 300 shown in FIG. 1 may be implemented in an IC, ASIC, FPGA or any other suitable type of circuit. Those skilled in the art should also appreciate that in some embodiments, all or part of the functionality previously described herein with respect to token processing logic may be implemented as pre-programmed hardware or firmware elements (e.g., integrated circuit (IC), application specific integrated circuits (ASICs), DSPs, electrically erasable programmable read-only memories (EE-PROMs), etc.), or other related components.

The token processing logic may be implemented in a distributed manner in association with respective processing components in the set of processing components 302A-D and may optionally be integrated in each so that each processing component includes circuitry for propagating the token associated with resource component 308 in accordance with the process depicted in FIG. 2. As will be appreciated, such an implementation allows for a modular design of the circuit 300 and avoids requiring additional overhead circuitry and signalling for determining the manner in which the token is to be propagated.

Figure 3:
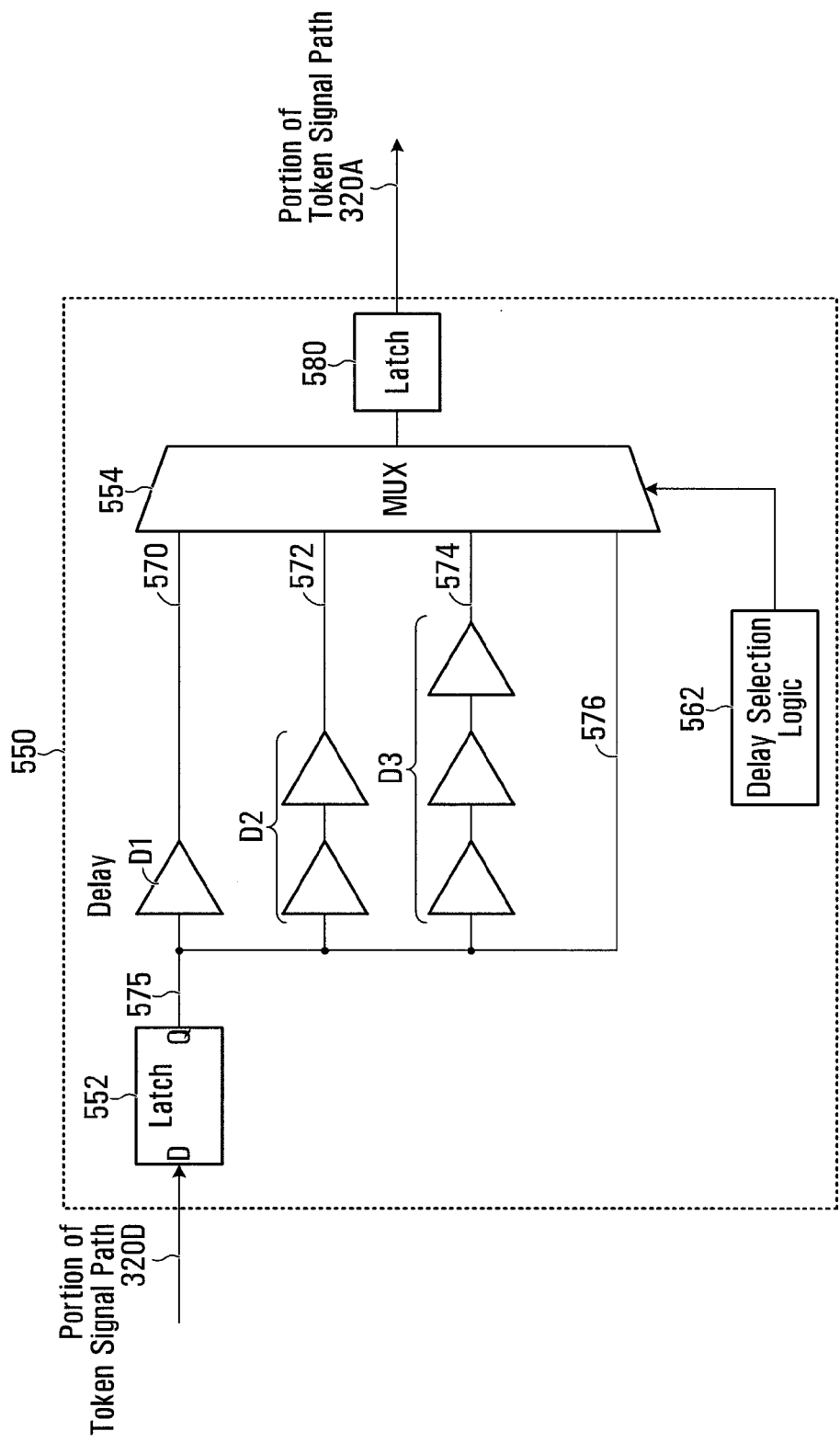
FIG. 3 shows a block diagram of a non-limiting example of implementation of a circuit including token processing logic suitable for implementing the process depicted in FIG. 2.

FIG. 3 of the drawings depicts an exemplary embodiment of a non-limiting example of implementation of token processing logic 550 suitable for implementing the process depicted in FIG. 2 in connection with processing component 302A shown in FIG. 1.

In the example depicted, the token processing logic 550 is in communication with the portion 320D and portion 320A of token signal path 310 (shown in FIG. 1). The circuit depicted includes a latch 552, a set of delay paths 570 572 574 576, a multiplexer 554 and a delay path selection unit 562. Latch 552 is for capturing transitions in the signal traveling over portion 320D of the token signal path 310 wherein a transition conveys the arrival of the token. Latch 552 then propagates the transition over path 575 and then over each of delay paths 570 572 574 576. Each delay path in the set of delay paths 570 572 574 576 propagates the token towards multiplexer 554 at a respective rate by making use of various delay elements D1 D2 D3. As will be observed, delay path 576 propagates the token without inserting any additional delay. The delay path selection unit 562 is for controlling multiplexer 554 with a selection signal so that multiplexer 554 may select one of the signals arriving from set of delay paths 570 572 574 576 to propagate over portion 320A of token signal path 310.

The delay path selection unit 562 includes the required circuitry for selecting one of delay paths 570 572 574 576 depending on the transaction delay time that needs to be allocated to the resource component 308. The delay path selection unit 562 releases at its output the signal propagated on the selected one of delay paths 570 572 574 576. Optionally, as depicted in FIG. 3, the output of the delay path selection unit 562 is connected to a latch 580 in order to synchronize the communication with the shared resource component 308. In a first example of implementation, the delay path selection unit 562 implements step 402 of the process shown in FIG. 2 of the drawings. In situation where the processing component 302A does not wish to conduct a transaction with the shared resource component 308, the delay path selection unit 562 releases a signal for causing the multiplexer 554 to selected the signal appearing on delay path 576. Alternatively, in situation where the processing component 302A wishes to conduct a transaction with the shared resource component 308, the selection of the delay path amongst delay paths 570 572 574 may be effected for example, on the basis of the specific type of transaction that processing component 302A wishes to conduct with the shared resource component 308. In such a case, each one of delay paths 570 572 574 is associated with a respective specific type of transaction. The specific circuitry used by the delay path selection unit 562 to select for selecting one of delay paths 570 572 574 576 is not critical to the invention and many possible implementations will become apparent to the person skilled in the art in light of the present description. As such, specific circuitry that may be used by the delay path selection unit 562 will not be described in further detail here. It will also be appreciated that, for the purpose of simplicity, certain signals originating from circuit components external to the token processing logic and that may be used by delay path selection unit 562 in the selection of one of delay paths 570 572 574 576 have been omitted from the circuit shown in FIG. 3. For examples, signal conveying whether processing component 302A wishes to conduct with the shared resource component 308 and/or signals conveying the type of transaction required, amongst other, have not been shown in the figure.

It will be appreciated that many suitable variants exists, which will become apparent to the person skilled in the art in light of the present description, and that the circuit shown in FIG. 3 has been shown for the purpose of illustration only.

Figure 4:
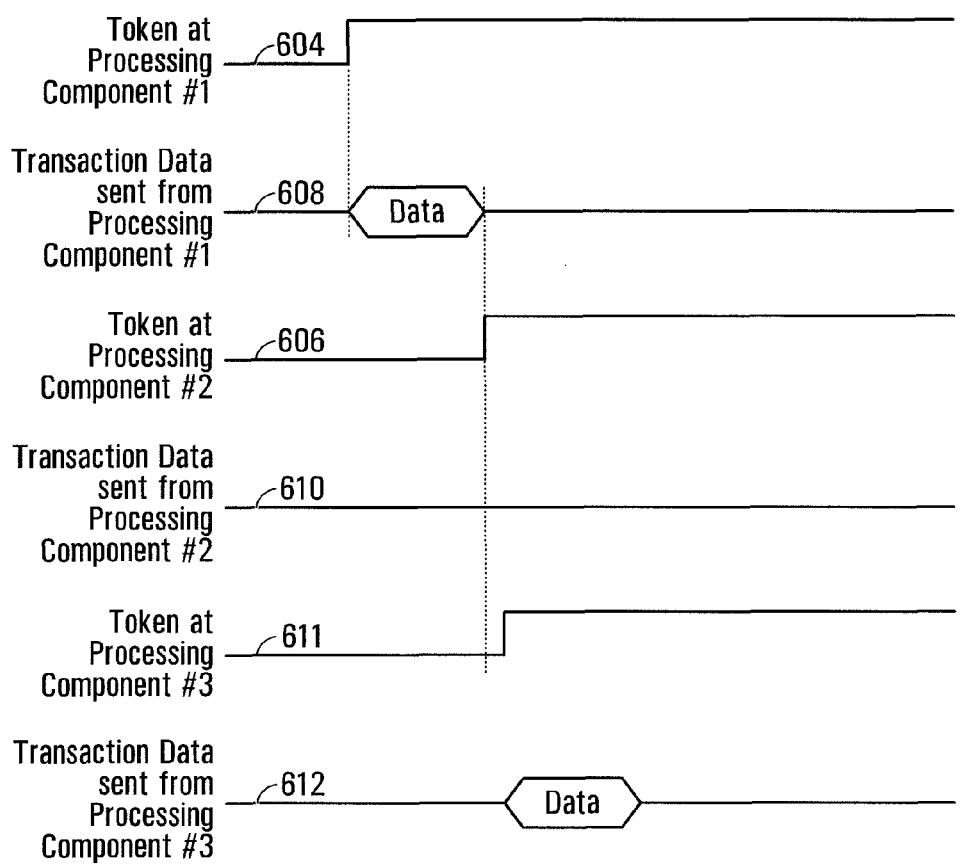
FIG. 4 shows a sample timing diagram showing various signal levels of the exemplary circuit shown in FIG. 2.

FIG. 4 of the drawings shows exemplary timing diagrams of the circuit depicted in FIG. 1. As shows:

Timing signal 604 corresponds to the signal on portion 320D of token signal path 310 (shown in FIG. 1)

Timing signal 608 corresponds to signals sent over data line 350A by processing component 302A (shown in FIG. 1)

Timing signal 606 corresponds to the signal on portion 320A of token signal path 310 (shown in FIG. 1)

Timing signal 610 corresponds to signals sent over data line 350B by processing component 302B (shown in FIG. 1). In this example, processing component 302B does not wish to conduct a transaction with resource component 308 and so no transaction data is actually sent.

Timing signal 611 corresponds to the signal on portion 320B of token signal path 310 (shown in FIG. 1). As can be seen, the token signal on portion 320B had a transition that appears without having to wait for a transaction delay time to elapse;

Timing signal 612 corresponds to signals sent over data line 350C by processing component 302C (shown in FIG. 1)

It will be appreciated by the person skilled in art that, although the exemplary circuit shown in FIG. 1 depicts four processing components 302A-D, alternative practical implementations of the invention may include fewer or additional processing components without detracting from the invention.

In addition, it will also be appreciated by the person skilled in art that, although the exemplary circuit shown in FIG. 1 depicts a single shared resource component 308, alternative practical implementations of the invention may include additional shared resource components without detracting from the invention.

Figure 5:
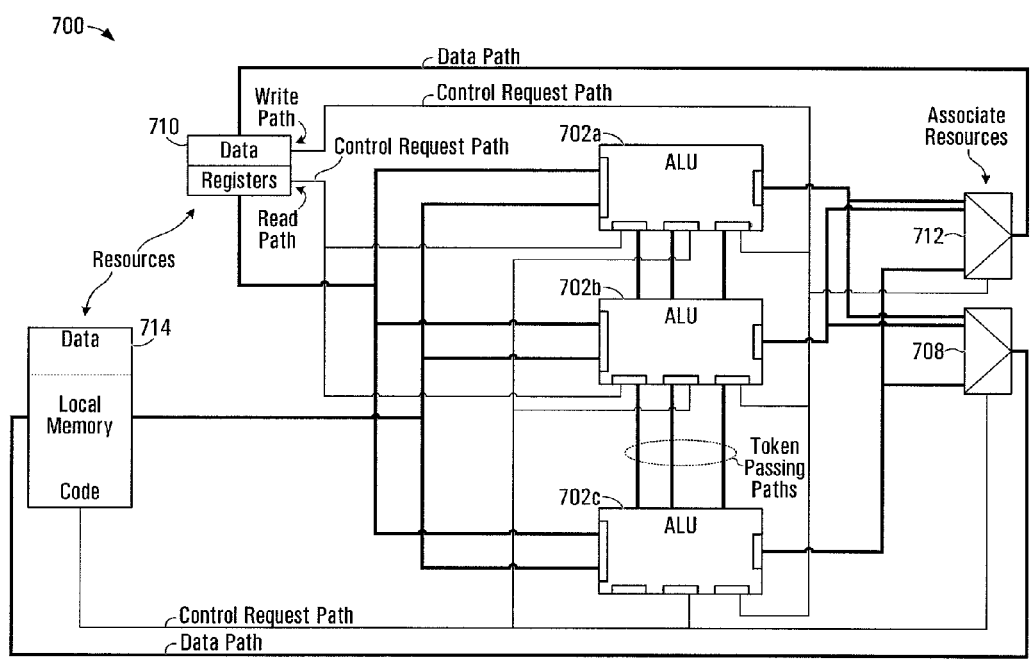
FIG. 5 shows a block diagram of an exemplary circuit in accordance with an example of a variant of the present invention.

FIG. 5 shows a block diagram of an exemplary circuit 700 in accordance with a variant of the present invention. As depicted, the circuit 700 includes a set of processing components 702*a-c* in the form of arithmetic and logic units (ALUs). In this example, the processing components in the set 702*a-c* are identical to one another. The circuit 700 also includes a plurality of resource components 708 710 712 714 shared between the processing components 702*a-c*. Each resource component in the plurality of resource components 708 710 712 714 is analogous to resource component 308 and includes a respective resource interface analogous to resource interface 312 (both shown in FIG. 1). In the example depicted:

1. Resource components 710 corresponds to a set of registers
2. Resource components 712 and 708 correspond to other shared resources such as (for example) an instruction (cache) memory, a data (cache) memory and an advanced computation component;
3. Resource components 714 corresponds to a local memory module The resource components in the plurality of resource components 708 710 712 714 may operate asynchronously with one another and may be clocked circuits or asynchronous circuits. A token signal path is provided for each resource component in the plurality of resource components 708 710 712 714. Each token signal path is analogous to token signal path 310 (shown in FIG. 1) and is for propagating a token associated with a given one of the resource components 708 710 712 714. Token processing logic allows propagating each one of the tokens associated with the resource components 708 710 712 714 along a respective token signal path in a manner similar to that described with reference to FIG. 2. The token processing logic propagates each token in the plurality of tokens from one processing component to another processing component along a respective token signal path at a propagation rate that is related to the transaction rate of the resource with which the token is associated. Each token is propagated independently from another in order to grant a processing component access to each resource component independently from other resource components. Possession of a given token by a given processing component enables the given processing component to conduct a transaction with the resource component associated with the given token. In specific examples of implementation of the invention, each token is propagated at a propagation rate that is independent from the propagation rate of other tokens. This may allow, for example, customizing the propagation rate for a given token so that it better suited to the particular shared resource to which it is associated.

Variant

In accordance with a variant, a trigger signal is derived at least in part based on the token associated with the shared resource component 308 (shown in FIG. 1). The trigger signal may be embodied in a signal of any suitable form including for example an edge (rising or falling), a pulse and/or any other suitable type of signal. In implementations including a plurality of resource components, respective trigger signals may be generated for each shared resource component. For the purpose of simplicity, the description of this variant will be made with respect to a single shared resource component 308 however the person skilled in the art will appreciate that the concepts described herein may be extended to multiple shared resource component.

The trigger signal conveys the initiation of a transaction with a given processing component and may be propagated to the shared resource component. In accordance with a non-limiting implementation, the shared resource component may use the trigger signal for a number of purposes such as for example resetting internal memory devices/circuit components and/or synchronizing its internal clock amongst others. Optionally the trigger signal may also be used to cause the generation of a clock signal for use by the shared resource component. Optionally still, the trigger signal may be used for asynchronously transferring a transaction to a shared resource. Optionally still, the trigger signal may be a source of all required edges to process the transaction with a one-to-one correspondence. Depending on the use made by the shared resource component of the trigger signal, suitable circuitry is provided for processing the trigger signal.

Figure 6:
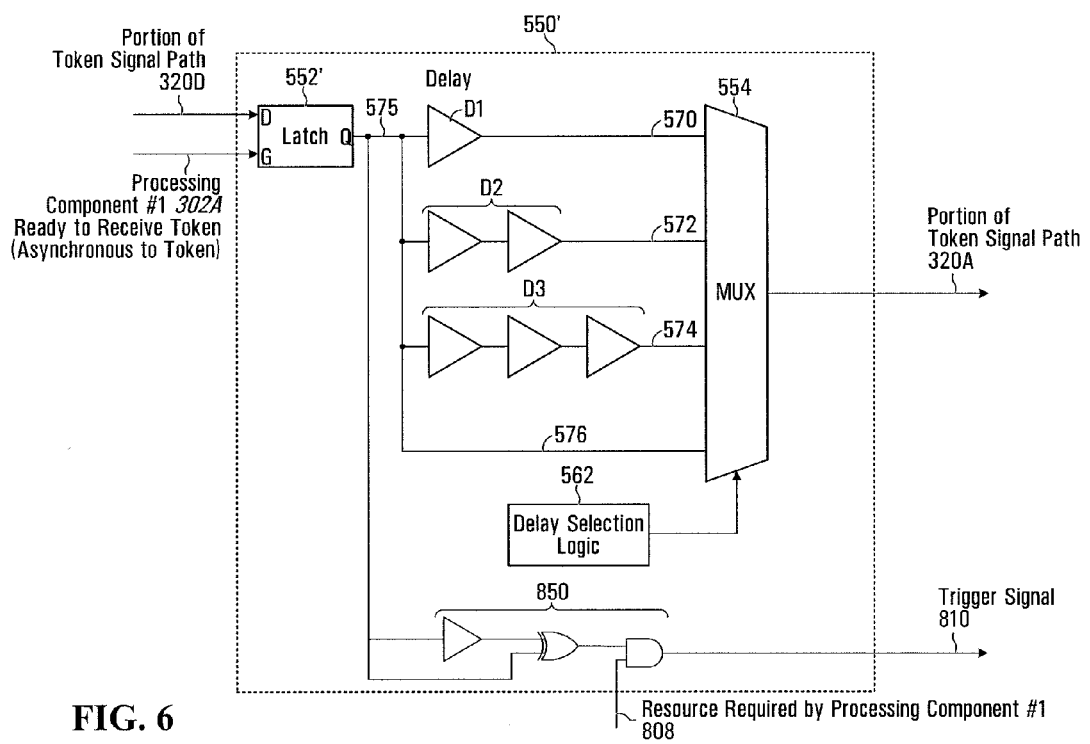
FIG. 6 shows a block diagram of a non-limiting example of implementation of token processing logic for use in connection with processing component #1 depicted in FIG. 1 in accordance with an alternative example of implementation of the present invention.

FIG. 6 of the drawings depicts the token processing logic 550 described with reference to FIG. 3 modified to further generate a trigger signal in accordance with the above described variant. For the purpose of clarity, the "modified" token processing logic depicted in FIG. 6 will be referred to as token processing logic 550'.

As can be observed from FIG. 6, the token processing logic 550' is in communication with the portion 320D and portion 320A of token signal path 310 (shown in FIG. 1). In addition to the components of token processing logic 550 described with reference to FIG. 3, token processing logic 550' includes a trigger control path 850 which will be described in greater detail below. In the example depicted in FIG. 6, token processing logic 550' omits optional latch 580 described with reference to FIG. 3 since synchronization of the communication with the resource component 308 is instead achieved via the trigger control path 850. In addition, latch 522 depicted in FIG. 3 has been replaced by latch 522' which includes an addition input (labelled as input "G") for turning on the latch. The addition input "G" is for receiving a signal indication that the processing component #1 302A (depicted in FIG. 1) is ready to receive the token associated with the shared component 308.

The trigger control path 850 is in communication with path 575 and includes the required circuitry for detecting the presence of a transition on path 575, which conveys the arrival of a token. In cases where signal 808 indicates that the shared resource is required by the processing component, the trigger control path 850 generates a trigger signal upon detection of a transition on path 575. The trigger signal is propagated along path 810 towards the shared resource component.

The specific circuitry used in trigger control path 850 to generate the trigger signal may vary from one implementation to the other and many possible implementations will become apparent to the person skilled in the art in light of the present description.

In the example depicted in FIG. 6, a combination of logic gates is shown for generating the desired trigger signal. In cases where signal 808 indicates that the shared resource is required, the trigger control path 850 will generate a trigger signal in the form of a pulse upon detection of a transition on path 575.

It is to be appreciated that, although the circuit depicted generates a pulse as a trigger signal, circuits for generating other forms of trigger signals (e.g. rising/falling edges) may also be contemplated in alternative examples of implementation of the invention.

It is also to be appreciated that, for the purpose of simplicity, certain circuit components external to the token processing logic and/or signals originating from circuit components external to the token processing logic and that may be used by components of token processing logic 550' have been omitted from the circuit shown in FIG. 6. For example, components for generating signal 808 conveying whether processing component 302A wishes to conduct with the shared resource component 308 and/or signals conveying the type of transaction required, amongst other, have not been shown in the Figure.

This example of implementation of the above variant of the invention is one of many that provide use of the token passing mechanism where all processing components and shared resources are asynchronous to one another.

Variant—Shared Resource Component 308

As indicated above with reference to FIG. 6, the trigger signal released by the trigger control path 850 may optionally be used to cause the generation of a clock signal for use by the shared resource component 308 (shown in FIG. 1). An advantage of such an approach is that it allows the trigger signal, and therefore the token, to be used to grant access to the shared resource component 308, to synchronize the communication between the processing components 302A-D and the shared resource component 308 and to clock the resource component 308 based on the initiation of a transaction between the shared resource component 308 and a given processing component.

Although the term "clock signal" is traditionally used to refer to a pulse train having a uniform frequency, for the purpose of the present description the term "clock signal" is used to refer to any reference signal used for the purpose of causing a clocked circuit device to alter its state. Clocked devices generally respond to a predefined characteristic or event of a reference signal such as a rising (or leader) edge, a falling (or trailing) edge or both edges, in order to alter their state. As such, the term "clock signal" is used to refer to a reference signal having a series of rising and falling edges where the rising and falling edges occur at a uniform frequency or at variable frequencies.

In a specific example of implementation, the shared resource component 308 in accordance with this variant includes circuitry responsive to the receipt of the trigger signal released on path 810 for causing the generation of a clock signal. The specific circuitry used by the shared resource component 308 for generating the clock signal may vary.

Figure 7:
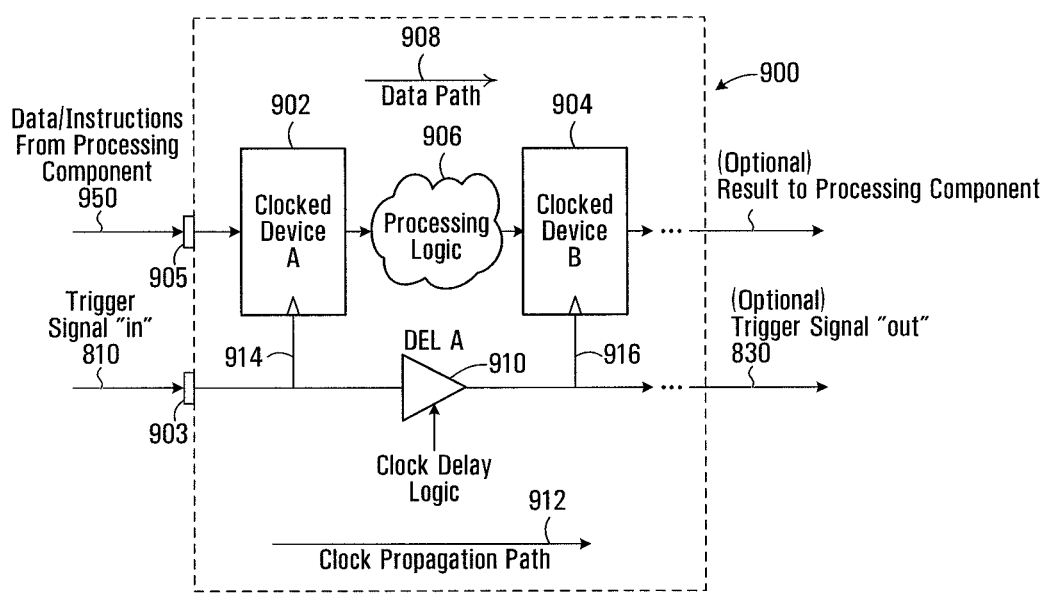
FIG. 7 shows a block diagram of a circuit segment in a shared resource component in accordance with a variant of the present invention.

FIG. 7 of the drawings depicts an exemplary portion of a shared resource component circuit in accordance with a non-limiting example of implementation of this variant. It is to be appreciated that this exemplary portion 900 is being presented here for the purpose of illustration only and to facilitate the reader's understanding.

With reference to FIG. 7, there is shown a block diagram of a circuit segment 900 of shared resource component circuit in accordance with a specific example of implementation of a variant of the invention. As depicted, the circuit segment 900 includes a first clocked device 902, a second clocked device 904, a data path 908 between the first clocked device 902 and the second clocked device 904 and a clock propagation path 912.

First and Second Clocked Devices 902 and 904

The first and second clocked devices 902 and 904 may be embodied as any suitable circuit devices that are responsive to clock signals in order to alter their state and may include any number of input and output data lines. Examples of such circuit devices include latches and flip-flops. In the non-limiting example depicted, first clocked device 902 is in communication with an input 905 for receiving data and/or instructions from a processing component over input data line(s) 950.

Data Path 908

The data path 908 propagates data released by the first clocked device 902 to the second clocked device 908.

The data path 908 includes processing logic 906 which may include any number of electronic components, such as logic gates for examples, which manipulate the data released by the first clocked device 902. The specific nature of the processing logic 906 and the functions it implements are not critical to the invention and therefore will not be described further here. It is however to be appreciated that the data released by the first clocked device 902 takes a certain amount of time to propagate through the processing logic 906 to reach the second clocked device 904. This amount of time required to data to propagate through the processing logic 906 is referred to as the propagation delay of data path 908.

The person skilled in the art will appreciate that, in certain embodiments, the processing logic 906 may be such that the data path 908 may include a plurality of data sub-paths between the first clocked device 902 and the second clocked device 904, wherein each data sub-path propagates at least a portion of the data released by the first clocked device 902 to the second clocked device 904. Each of the data sub-paths may include any number of electronic components, such as logic gates for examples, which manipulate the data released by the first clocked device 902. It will be appreciated that the time taken for data to propagate from the first clocked device 902 to the second clocked device 904 may vary depending on the data sub-path taken. As such, each data sub-path is associated with a respective sub-path data propagation delay.

Figure 8A:
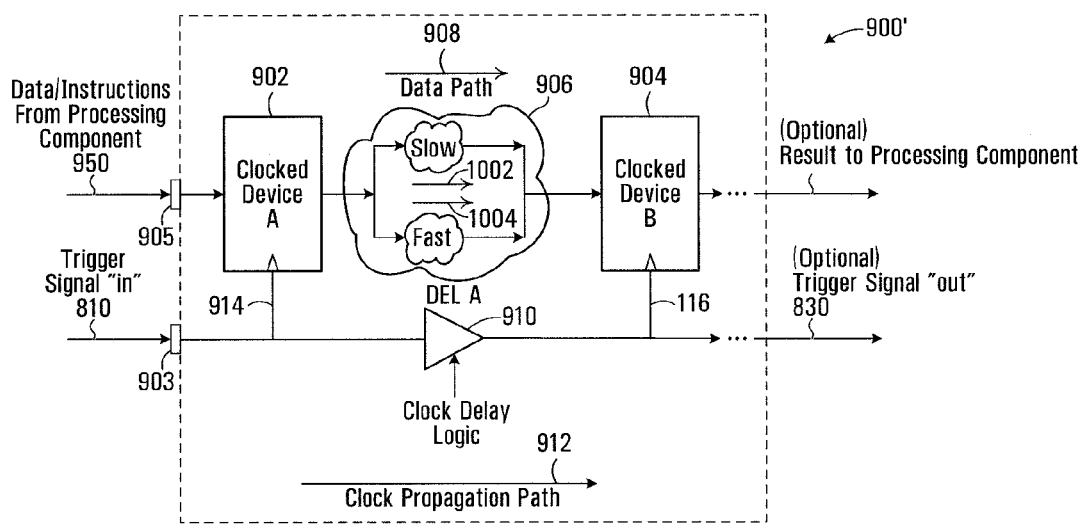
FIG. 8A shows a block diagram of another type of circuit segment in a shared resource component in accordance with a variant of the present invention.

An example of an embodiment in which processing logic 906 includes multiple sub-paths is illustrated in FIG. 8A. In the example shown, two data sub-paths 1002 1004 are illustrated, namely a slow data sub-path 1002 and a fast data sub-path 1004. It will be appreciated that many other sub-paths may be present in processing logic 906 but these have been omitted from the Figure for the purpose of simplicity.

The slow data sub-path 1002 is the sub-path in the data path 908 that has the longest (slowest) propagation delay. In other words, the sub-path propagation delay of the slow data sub-path 1002, herein referred to as the slow sub-path data propagation delay, is at least as long as the sub-path data propagation delays of each of the other data sub-paths part of data path 908.

The fast data sub-path 1004 is the sub-path in the data path 908 that has the shortest (fastest) propagation delay. In other words, the sub-path propagation delay of the fast data sub-path 1004, herein referred to as the fast sub-path data propagation delay, is at least as short as the sub-path data propagation delays of each of the other data sub-paths part of data path 908.

In such implementations, the data propagation delay of data path 908 is the time taken for all data propagating through processing logic 906 to arrive at the second clocked device 904. As such the data propagation delay of data path 908 corresponds to the sub-path propagation delay associated with the slow data-path 1002.

Optionally, data path 908 may be comprised of multiple logical data paths that may be selected on the basis of a control signal, which may vary from one clock event to the next.

Figure 8B:
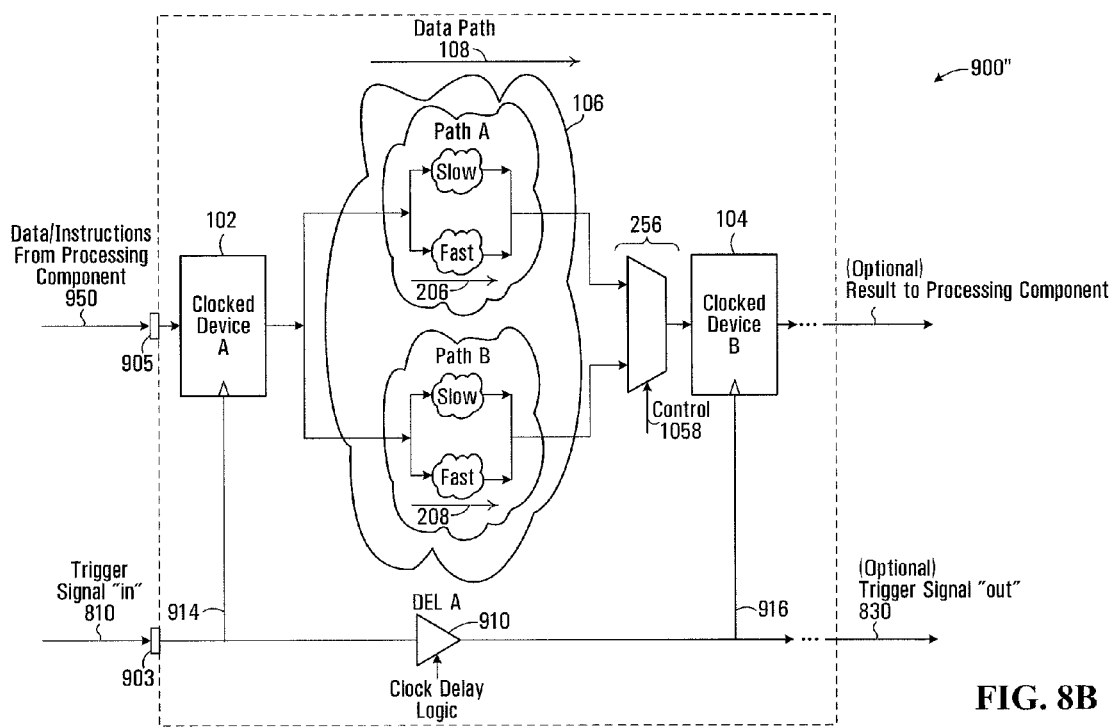
FIG. 8B shows a block diagram of yet another type of circuit segment in a shared resource component in accordance with a variant of the present invention.

An example of an embodiment in which data path 908 includes multiple logical paths is illustrated in FIG. 8B. In the example shown, two selectable logical data paths 1006 1008 are illustrated, namely Path A 1006 and Path B 1008. It is to be noted that Path A 1006 and Path B 1008 shown in FIG. 8B are logical data paths rather than physical paths, wherein each logical data path applies a certain processing logic to the data releases by the first clocked device 902. In addition, it is to be appreciated that, while Path A 1006 and Path B 1008 are independent logical data paths, they may in practical implementations share common circuit components As depicted in FIG. 8B, processing logic 906 further includes a logical data path selection module 1056 responsive to a control signal 1058 for selecting the desired logical data path, either Path A 1006 or Path B 1008 in the figure. In the specific example depicted, the logical data path selection module 1056 includes a multiplexor.

As will be appreciated by the person skilled in the art, by associating control (selection) signal 1058 to an external input and by making this input controllable through a suitable interface, the effective processing applied to the data released by the first clocked device may be based on any suitable criteria, such as a processor instruction, a signal generated by the first clocked device 902 or some other circuitry.

In the configuration shown in FIG. 8B, each logical data path 1006 1008 has a respective slow and fast data sub-paths.

In such a variant, the data propagation delay of data path 908 is the time taken for all the data propagating along the logical data path selected by the data path selection module 1056. As such the data propagation delay of data path 908 corresponds to the sub-path propagation delay associated with the slow data-path of the selected logical data path (either Path A 1006 or Path B 1008 in the figure).

It will be appreciated that, although the examples in FIG. 8B has illustrated two logical data paths 1006 1008, this illustration was presented for the purpose of simplicity and practical implementations of processing logic 906 may include many more logical data paths without detracting from the spirit of the invention.

Clock Propagation Path 912

The clock propagation path 912, depicted in FIGS. 7, 8A and 8B, is for propagating clock signals 914 916 to the first clocked device 902 and the second clocked device 904.

The clock signal 914 propagated to the first clocked device 902 is received at input 903 and is generated by a component external to the circuit segment 900 shown in FIG. 7. In this specific example of implementation, the clock signal received at input 903 corresponds to the trigger signal propagated over path 810 and which was generated by the token processing logic 550' described with reference to FIG. 6.

In the example depicted, the clock signal 916 propagated to the second clocked device 904 is a delayed version of clock signal 914. In this regard, the clock propagation path 912 includes clock delay logic 910 which receives the clock signal 914 and delays it by a clock delay interval.

The clock delay interval applied by the clock delay logic 910 is selected so that data released by the first clocked device 902 has sufficient time to propagate through data path 908 and reach the second clocked device 904 before the second clocked device reads the data arriving on the data path. As such the clock delay interval is related to the propagation delay of data path 908. The propagation delay of data path 908 may be determined using any suitable approach known in the art of circuit design.

In a specific example of implementation, the clock delay interval is selected to be at least as long as the propagation delay of data path 908. Mathematically, this may be expressed as follows:

$$\text{DEL\_}A \geq \text{propagation delay of data path 908} \quad (1)$$

Where DEL_A is the clock delay interval applied by the clock delay logic 910.

In another specific example of implementation, the clock delay interval is selected to be at least as long as the propagation delay of data path 908 and also takes into account a skew factor associated with the propagation of the clock over the clock propagation path 912. Mathematically, this may be expressed as follows:

$$\text{DEL\_}A \geq \text{propagation delay of data path 908} + \text{Clock Skew factor} \quad (2)$$

where the "Clock Skew factor" may be selected in accordance with any suitable known method.

The clock delay logic 910 may make use of any suitable circuit components for delaying a signal by a certain desired time period. Such circuit components are well known in the art of circuit design.

Figure 11A:
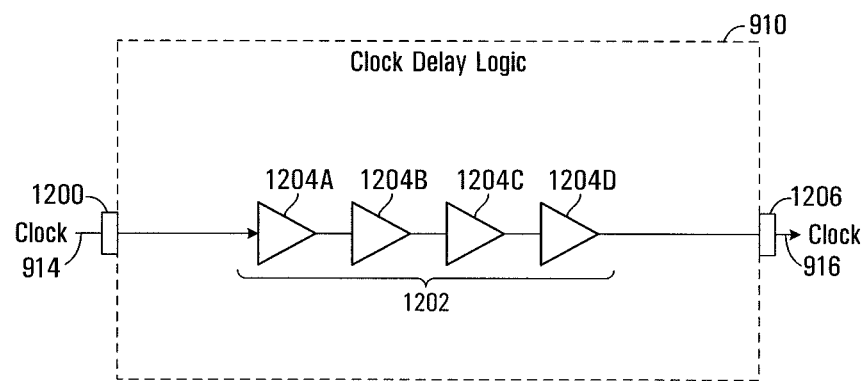
FIG. 11A shows a block diagram of clock delay logic for use in connection with the circuit segment shown in FIG. 7.

A first specific example of implementation of the clock delay logic 910 is shown in FIG. 11A of the drawings. As depicted, the clock delay logic 910 includes an input 1200 for receiving the first clock signal 914, a delay circuit 1202 for delaying the first clock signal 914 by a clock delay interval to obtain a delayed version of the first clock signal 914. The clock delay logic 910 also includes an output 1206 for releasing the delayed version of the first clock signal as the second clock signal 916. The delay circuit 1202 includes a series of delay elements 1204A-D for implementing a desired delay interval.

As will be appreciated by the person skilled in the art, the precise propagation delays in circuit segment 900 (shown in FIG. 7) may be affected by a plurality of factors, all of which may be not be accurately modelled by common circuit design tools. For example, although the selection of "DEL_A" in equation (2) above provides for the used of a skew factor for the clock, current design tools for integrated circuits may not accurately model the phenomenon of clock skew since the latter is due in part to the physical properties of the material with which the integrated circuit is built. Moreover, the physical properties of the material may vary from one integrated circuit to the other, which may affect the propagation delays of the signals in the circuit segment 900.

In order to more specifically account for possible variations in the propagation delays, in a variant of the invention, the clock delay logic 910 makes the clock propagation delay a selectable parameter.

Figure 11B:
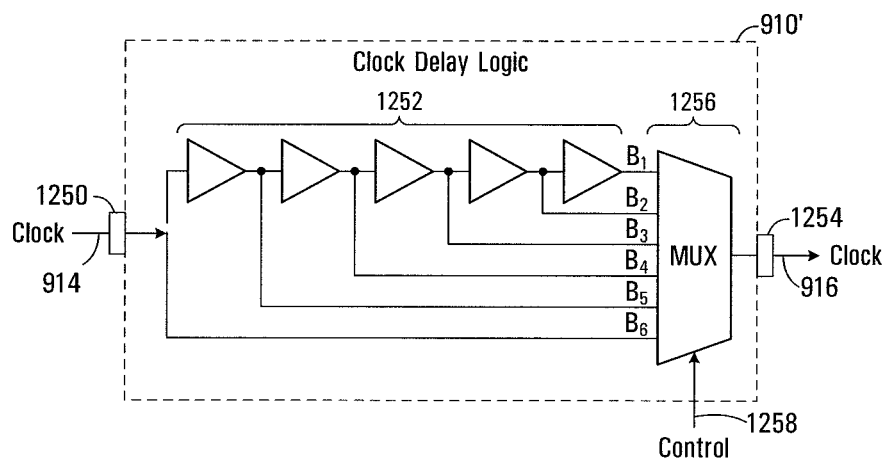
FIG. 11B shows a block diagram of a different configuration of clock delay logic for use in connection with the circuit segment shown in FIG. 7.

A specific example of implementation of the clock delay logic 910 in accordance with such a variant is shown in FIG. 11B of the drawings and is referred to as clock delay logic 910'. As depicted, the clock delay logic 910' includes an input 1250 for receiving the first clock signal 914, a delay circuit 1252 for generating a plurality of delayed versions of the first clock signal 914, where each delayed version is associated with a respective clock delay interval in a set of possible clock delay intervals. The delayed versions of the first clock signal 914 are designated as signals $B_1, B_2, \ldots, B_6$ in FIG. 11B. The clock delay logic 910' also includes a clock delay interval selection module 1256 responsive to a control signal 1258 for selecting a delayed version of the first clock signal amongst the plurality of delayed versions of the first clock signal. The clock delay logic also includes an output 1254 for releasing the selected delayed version of the first clock signal as the second clock signal 916.

Figure 12:
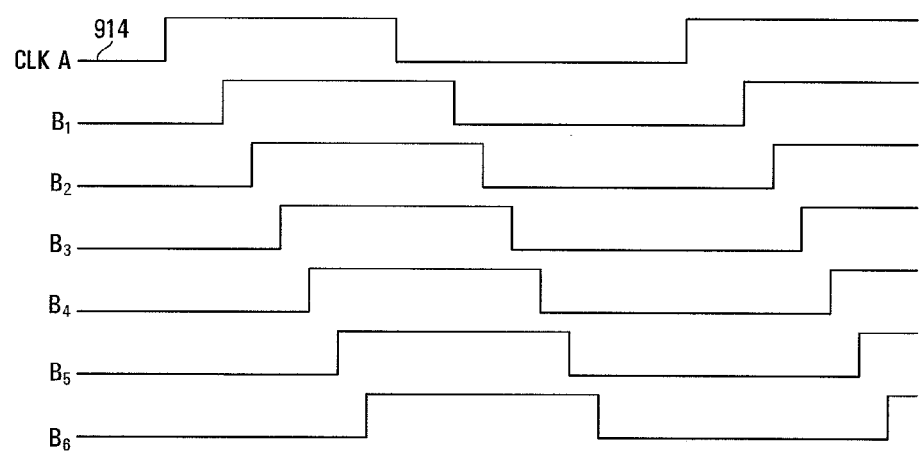
FIG. 12 shows timing diagrams showing different delayed versions of the clock signals being generated by the clock delay logic shown in FIG. 11B.

FIG. 12 of the drawings illustrates by means of a timing diagram different delayed versions of clock signal 914 being generated by the clock delay logic shown in FIG. 11B.

In the specific example depicted, the clock delay interval selection module 1256 includes a multiplexor for selecting a delayed version of the first clock signal 914 amongst the plurality of delayed versions of the first clock signal 914.

As will be appreciated by the person skilled in the art, by associating control signal 1258 to an external input and by making this input controllable through a suitable interface, the delay interval may be modified at different stages of the design and implementation of a circuit incorporating the circuit segment 900 (shown in FIG. 7) such as:
- during the design of the circuit incorporating the circuit segment 900;
- during the manufacturing of the circuit incorporating the circuit segment 900;
- post-fabrication of the circuit incorporating the circuit segment 900.

It is to be appreciated by the person skilled in the art that the embodiment depicted in FIG. 11B is but one of many possible implementations of a circuit for deriving a clock delay interval and that many variants may be contemplated without detracting from the spirit of the invention.

Optionally, in implementations in which the data path 908 includes multiple selectable logical data paths between the first clocked device and the second clocked device, as shown in FIG. 8B, control signal 1258 may be derived in part based on the control (selection) signal 1058 (shown in FIG. 8B) used to select one of the logical data paths. As will be appreciated by the person skilled in the art, by deriving control signal 1258 in part based on the control (selection) signal 1058, the clock delay interval used can be influenced by the propagation delay of the logical data path selected. As mentioned above, the selected logical data path may vary from one clock event to the next.

Figure 11C:
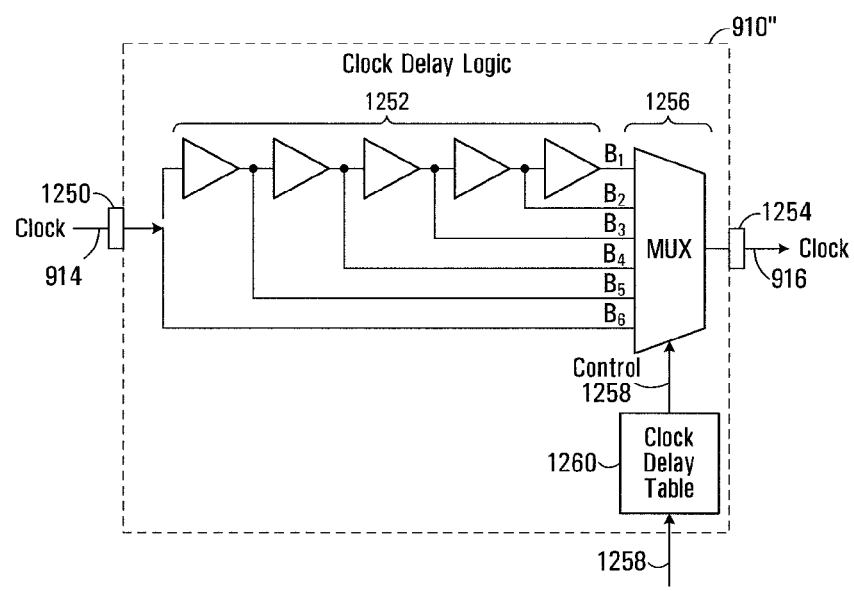
FIG. 11C shows a block diagram of yet another different configuration of clock delay logic for use in connection with the circuit segment shown in FIG. 7.

A specific example of implementation of the clock delay logic 910 in accordance with such a variant is shown in FIG. 11C of the drawings and is referred to as clock delay logic 910". As was the case for clock delay logic 910' depicted in FIG. 11B, the clock delay logic 910" includes an input 1250 for receiving the first clock signal 914, a delay circuit 1252 for generating a plurality of delayed versions of the first clock signal 914, a clock delay interval selection module 1256 responsive to a control signal 1258 for selecting a delayed version of the first clock signal amongst the plurality of delayed versions of the first clock signal. The clock delay logic also includes an output 1254 for releasing the selected delayed version of the first clock signal as the second clock signal 916.

In accordance with this variant, the control signal 1258 is derived in part based on control (selection) signal 1058, which was used to select one of the logical data paths 1006 1008 shown in FIG. 8B. In the specific embodiment depicted, the clock delay selection signal 1258 is selected from a clock delay table 1260 by control (selection) signal 1058.

As will be appreciated by the person skilled in the art, by making the entries in the clock delay table 1260 programmable, the values contained in such a clock delay table 1260 may be established at different stages of the design and implementation of a circuit incorporating the circuit segment 900 (shown in FIG. 7) such as:
- during the design of a circuit using incorporating the circuit segment 900;
- during the manufacturing of a circuit incorporating using the circuit segment 900;
- post-fabrication of a circuit incorporating using the circuit segment 900.

It is to be appreciated by the person skilled in the art that the embodiment depicted in FIG. 11C is but one of many possible implementations in which control signal 1258 is derived at east in part based on the control (selection) signal 1058 and that other variants may be contemplated without detracting from the spirit of the invention.

Returning now to FIG. 7, the clock signal 914 includes a series of trigger signals (rising edges, falling edges or both—also referred to as clock events) to which the first clocked device 902 is responsive for altering its state. The highest rate at which trigger signals can be received by the shared resource component without corrupting the data, which corresponds to the shortest time interval between trigger signals, is referred to as the (maximum) transaction rate of the resource component.

In a first specific example of implementation, the time interval between consecutive clock events/trigger signals (rising edges, falling edges or both) to which the first clocked device 902 is responsive is set so that the data released by the first clocked device 902 arrives at and is sampled by the second clocked device 904 before new data is released by the first clocked device for propagation over data path 908. Mathematically, this may be expressed as follows:

$$\text{Time interval between clock events} \geq DEL\_A$$

Where DEL_A is the clock delay interval applied by the clock delay logic 910 and where DEL_A satisfies either one of mathematical relationships (1) or (2) presented above and reproduced below for the reader's ease of reference:

$$DEL\_A \geq \text{propagation delay of data path 908} \quad (1)$$

$$DEL\_A \geq \text{propagation delay of data path 908+Clock Skew factor} \quad (2)$$

It will also be appreciated that, in practical implementations, non-zero skews associated with the data path 908 and clock propagation path 912 may be taken into account in setting the time interval between consecutive clock events. Mathematically, this may be expressed as follows:

$$\text{Time interval between clock events} \geq DEL\_A + \text{skew factor(clock delay logic 910)} + \text{skew factor(data path 908)}$$

In a second specific example of implementation, the time interval between consecutive clock events (rising edges, falling edges or both) to which the first clocked device 902 is responsive is set so that data is released by the first clocked device 902 while previously released data is propagating through data path 908. As will be observed by the person skilled in the art, new data may be released by the first clocked device 902 while previously released data is propagating through data path 908 without any of the data being corrupted, provided that the second clocked device 904 reads the previously released data before the new data arrives at the second clocked device. As such, it is possible for the clock period used for clock signal 914 to be set to be smaller than the clock delay time interval (DEL_A).

In particular, in implementations where the data path 908 includes multiple sub-paths, the time interval between consecutive clock events should allow for sufficient time for the second clocked device 904 to read previously released data before the new data arrives at the second clocked device 904. Since the propagation delay may vary between sub-paths, the time interval between consecutive clock events should allow previous data propagating on the fastest sub-path to be sampled by the second clocked device 904 before newly released data propagating on the fastest sub-path arrives at the second clocked device 904.

In a specific example of implementation, the time interval between consecutive clock events is set so that it is no shorter than the difference between the clock delay interval applied by the clock delay logic 910 and the fast sub-path propagation delay. Optionally, in practical implementations, non-zero skews associated with the data path 908 and clock propagation path 912 may be taken into account in the time interval between consecutive clock events. Mathematically, this may be expressed as follows:

Time interval between clock events≧DEL_A−(fast sub-path propagation delay)+skew factor(clock delay logic 910)+skew factor(data path 908)

where skew factor(clock delay logic 910) and skew factor (data path 908) may be computed in accordance with any suitable method.

As will be appreciated by the person skilled in the art, in implementations where the data path 908 includes a single data sub-path, the time interval between consecutive clock events may be set to the difference between the clock delay interval applied by the clock delay logic 910 and the propagation delay of data path 908. Optionally, in practical implementations, non-zero skews associated with the data path 908 and clock propagation path may be taken into account in the time interval between consecutive clock events. Mathematically, this may be expressed as follows:

Time interval between clock events≧DEL_A−(path propagation delay of 908)skew factor(clock delay logic 910)+skew factor(data path 908)

It is to be observed that, in practical physical implementations of the circuit segment depicted in FIG. 7, the clock propagation path 912 and the data path 908 will be in physical proximity to one another and will experience similar environmental conditions (e.g. material, temperature etc. . . . ). As such, the amount of delay that needs to be added to account for these environmental variations is typically less than the amount of delay that must be added to account for such variations when the clock signal is centrally generated and distributed.

Exemplary Circuit

A plurality of circuit segments of the type depicted in FIG. 7 may be connected to one another to form a circuit implementing a desired function in the resource component 308 (shown in FIG. 1). The clock delay logic for each circuit segment may be designed independently from that of other circuit segments in accordance with the description set forth with reference to FIGS. 7, 8, 8B, 11A, 11B, and 11C. When the circuit segments in the plurality of circuit segments are driven by a common clock, in this case the trigger signal propagated over path 810, the time period between two consecutive clock events (trigger signals) is set to be at least as long as the longest time period between two consecutive clock events for all the circuit segments in the circuit.

Figure 9:
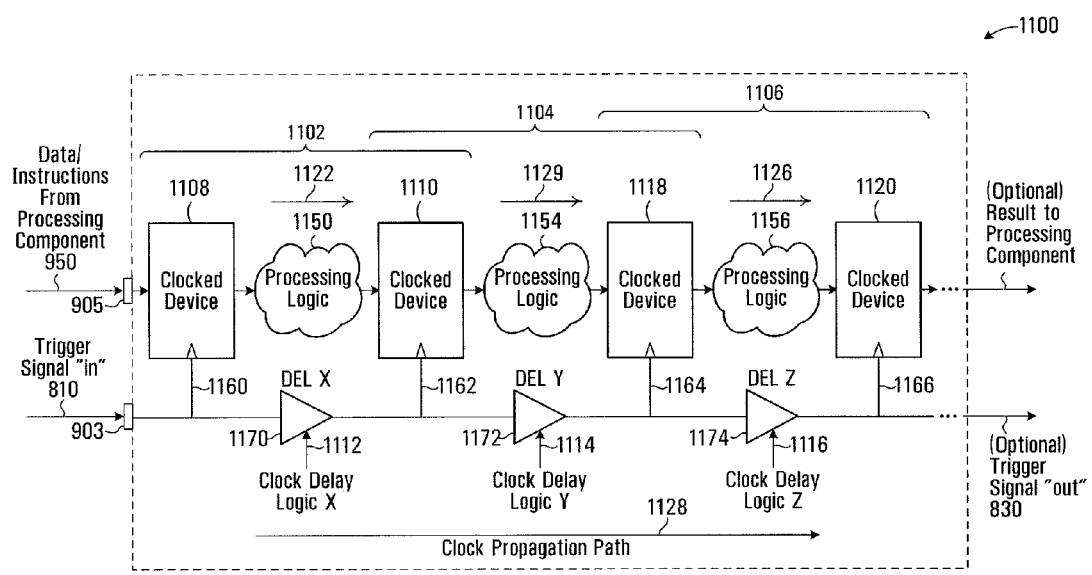
FIG. 9 shows a block diagram of a shared resource component including a plurality of circuit segments in accordance with a variant of the present invention.

A portion of an exemplary circuit incorporating a plurality of circuit segments is shown in FIG. 9 of the drawings.

As depicted, the portion 1100 of the exemplary circuit includes three (3) circuit segments 1102 1104 1106 each having a configuration similar to that of circuit segment 900 shown in FIG. 7 of the drawings.

In the example depicted, circuit segment 1102 includes clocked devices 1108 and 1110, a data path 1122 between the clocked devices 1108 and 1110 and clock delay logic 1170 on the portion of the clock propagation path 1128 between the clocked devices 1108 and 1110. Similarly, circuit segment 1104 includes clocked devices 1110 and 1118, a data path 1129 between the clocked devices 1110 and 1118 and clock delay logic 1172 on the portion of the clock propagation path 1128 between the clocked devices 1110 and 1118. Similarly still circuit segment 1106 includes clocked devices 1118 and 1120, a data path 1126 between the clocked devices 1118 and 1120 and clock delay logic 1174 on the portion of the clock propagation path 1128 between the clocked devices 1118 and 1120.

Data paths 1122, 1129 and 1126 are analogous to data path 908 described with reference to FIG. 7. Each of data paths 1122, 1129 and 1126 includes respective processing logic 1150 1154 1156 for processing data propagated over the data paths. Each one of data paths 1122, 1129 and 1126 is associated with a respective propagation delay. Optionally, each one of data paths 1122, 1129 and 1126 is also associated with a respective slow sub-path data propagation delay and fast sub-path data propagation delay.

Figure 10:
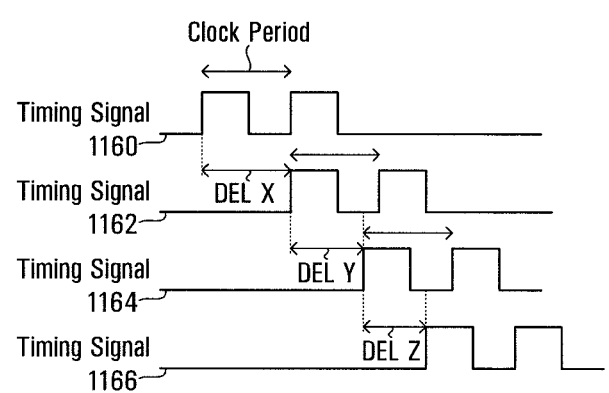
FIG. 10 is a sample timing diagram showing different clock signals being propagated in the circuit shown in FIG. 9.

In the example depicted, the clock signal 1166 propagated to clocked device 1120 is a delayed version of clock signal 1164 propagated to clocked device 1118, which is a delayed version of clock signal 1162 propagated to clocked device 1110, which in turn is a delayed version of clock signal 1160 propagated to clocked device 1108, which corresponds to the trigger signal propagated over path 810 and received at input 903. FIG. 10 shows an exemplary timing diagram for the clock signals 1160 1162 1164 1166.

As can be observed, the clocked devices 1108 1110 1118 and 1120 operate in accordance with respective clock signals that are offset from one another so that the change of state of these clocked devices 1108 1110 1118 and 1120 occurs at different times. As a result, such circuits would have fewer surges in power consumption (or surges of lesser magnitude) than conventional circuits where the components operate in accordance with a common global clock and change states at the same time.

Clock delay logic 1170 1172 and 1174 in clock propagation path 238 are analogous to clock delay logic 910 and 910' described with reference to FIGS. 7, 11A and 11B.

Each one of clock delay logic 1170 1172 and 1174 delays a clock signal that it receives by a respective clock delay interval related to a propagation delay of a corresponding one of the data paths 1122 1129 1126. In a specific example of implementation, the clock delay interval is selected to be at least as long as the propagation delay of the corresponding data path. Mathematically, this may be expressed as follows:

DEL_X≧propagation delay of data path 1122     (1)

DEL_Y≧propagation delay of data path 1129     (2)

DEL_Z≧propagation delay of data path 1126     (3)

Where DEL_X is the clock delay interval applied by the clock delay logic 1170; DEL_Y is the clock delay interval applied by the clock delay logic 1172 and DEL_Z is the clock delay interval applied by the clock delay logic 1174.

In a manner similar to clock delay logic 910 and 910' described with reference to FIGS. 7, 11A and 11B the clock delay intervals applied by clock delay logic 1170 1172 and 1174 may also take into account skew factors associated with the propagation of the clock over the clock propagation path 1128.

In addition, in a manner similar to clock delay logic 910' described with reference to FIG. 11B, the clock delay logic may allow the respective clock delay intervals applied by clock delay logic 1170 1172 and 1174 to be independently selectable parameters by providing suitable circuitry to that effect.

In a specific example of implementation, each one of clock delay logic component 1170 1172 and 1174 is associated to a respective control signal 1112 1114 and 1116 analogous to control signal 1258 described with reference to clock delay logic 910' (shown in FIG. 11B). As will be appreciated by the person skilled in the art, by associating control signals 1112 1114 and 1116 to inputs external to the circuit, and by making these inputs controllable through a suitable circuit interface, the delay intervals for each one of circuit segments 1102 1104 and 1106 may be modified at different stages of the design and implementation of the circuit such as:

- during the design of the circuit;
- during the manufacturing of the circuit;
- post-fabrication of the circuit.

As will be observed with reference to FIG. 9, clocked devices 1108 1110 1118 and 1120 are driven by respective clock signals originating from a common clock signal propagating over the clock propagation path 1128. In this case, the common clock signal is the trigger signal propagating over path 810 and which was generated by the token processing logic described with reference to FIG. 6. This clock signal (trigger signal) includes a series of clock events (rising edges, falling edges or both) to which the clocked devices are responsive for altering their respective states. The clock events may occur at a uniform frequency or, alternatively, may occur at variable frequencies.

In order to avoid the loss of data, the time between consecutive events in the trigger signal takes the data propagation delays of data paths 1122 1129 and 1126, and optionally, the clock delay intervals applied by clock delay logic 1170, 1172, and 1174, into account.

In a first non-limiting example of implementation, the time interval between consecutive clock events (rising edges, falling edges or both) in the trigger signal is set so that the data released by any one of clocked devices 1108 1110 1118 arrives at and is sampled by another clocked device before new data is released. Mathematically, this may be expressed as follows:

$$\text{Time interval between clock events} \geq \text{MAXIMUM}\{DEL\_X; DEL\_Y; DEL\_Z\}$$

It will also be appreciated that, in practical implementations, non-zero skews associated with the data paths 1122 1129 1126 and clock propagation path 1128 may be taken into account in the time interval between consecutive clock events.

In a second non-limiting example of implementation, the time interval between consecutive clock events is set so that data is released by any one of clocked devices 1108 1110 1118 while previously released data is propagating through at least one of data paths 1122 1129 1126.

In a specific example of implementation, the time interval between consecutive clock events is set so that it is at least as long as the longest one of the time intervals between consecutive clock events that are associated with the individual circuit segments 1102 1104 1106. Mathematically, this may be expressed as follows:

$$\text{Time interval between clock events for } 1102 \geq DEL\_X - (\text{fast sub-path propagation delay for } 1150) + \text{skew factor}(\text{clock delay logic } 1170) + \text{skew factor (data path } 1122)$$

$$\text{Time interval between clock events for } 1104 \geq DEL\_Y - (\text{fast sub-path propagation delay for } 1154) + \text{skew factor}(\text{clock delay logic } 1172) + \text{skew factor (data path } 1129)$$

$$\text{Time interval between clock events for } 1106 \geq DEL\_Z - (\text{fast sub-path propagation delay for } 1156) + \text{skew factor}(\text{clock delay logic } 1174) + \text{skew factor (data path } 1126)$$

$$\text{TIME INTERVAL BETWEEN CLOCK EVENTS FOR COMBINED CIRCUIT} \geq \text{MAXIMUM}\{\text{Time interval between clock events for } 1102; \text{Time interval between clock events for } 1104; \text{Time interval between clock events for } 1106\}$$

In other words, and as described above, the highest rate at which trigger signals can be received by the shared resource component without corrupting the data, which corresponds to the shortest time interval between clock events, is the (maximum) transaction rate of the resource component.

It will be appreciated that although the example shown in FIG. 9 includes only three (3) circuit segments, a practical circuit may include several thousands of such circuit segments in order to implement a desired function. In such implementations, the time interval between clock events would be at least as long as the longest of the time intervals between consecutive events that are associated with the individual circuit segments in the circuit.

Although the present invention has been described in considerable detail with reference to certain preferred embodiments thereof, variations and refinements are possible. Therefore, the scope of the invention should be limited only by the appended claims and their equivalents.

The invention claimed is:

1. A method for interfacing a plurality of processing components with a shared resource component, said method comprising:
   a) providing a token signal path to allow propagation of a token through the processing components in the plurality of processing components, wherein possession of the token by a given processing component enables the given processing component to conduct a transaction with the shared resource component;
   b) propagating the token from one processing component to another processing component along the token signal path, wherein the propagating of the token is done at a propagation rate that is related to a transaction rate associated with the shared resource component;
   c) generating a trigger signal at least in part based on the token;
   d) propagating said trigger signal to the shared resource component, wherein said trigger signal conveys initiation of a transaction with the shared resource component.

2. A method as defined in claim 1, further comprising using said trigger signal for generating a clock signal for use by the shared resource component.

3. A method as defined in claim 1, further comprising using said trigger signal for asynchronously transferring a transaction to a shared resource.

4. A method as defined in claim 1, further comprising using said trigger signal for synchronizing a clock associated with the shared resource component.

5. A method as defined in claim 1, wherein the propagation rate of the token from the one processing component to another processing component is at most the transaction rate associated with the shared resource component.

6. A method as defined in claim 1, wherein propagating the token from the one processing component to another processing component along the token signal path comprises:
   i. determining if the one processing component desires a transaction with the shared resource component;
   ii. if the one processing component desires a transaction with the shared resource component:
      (a) retaining the token while the processing component initiates the transaction with the shared resource component;
      (b) after a transaction delay time has elapsed, releasing the token so that it is propagated along the token signal path to another processing component, wherein the transaction delay time is related to the transaction rate associated with the shared resource component;
   iii. if the one processing component desires no transaction with the shared resource component, releasing the token so that it is propagated along the token signal path to another processing component.

7. A method as defined in claim 6, wherein the transaction delay time is a pre-determined duration.

8. A method as defined in claim 1, wherein the transaction rate is a transaction acceptance rate associated with the resource component, the transaction acceptance rate being indicative of a rate at which the resource component can accept transaction requests.

9. A method as defined in claim 8, wherein the transaction delay time is such that token is propagated as a rate no faster than the transaction acceptance rate associated with the resource component.

10. A method as defined in claim 1, wherein the transaction rate is a transaction completion rate associated with the resource component.

11. A method as defined in claim 10, wherein the transaction completion rate is indicative of a rate at which the resource component can issue a reply to a transaction request originating from a processing component.

12. A method as defined in claim 10, wherein the transaction delay time is such that the token is propagated at a rate no faster than the transaction completion rate associated with the resource component.

13. A method as defined in claim 1, wherein the transaction rate varies depending on the transaction to be conducted with the shared resource component.

14. A method as defined in claim 1, wherein the transaction conducted with the shared resource component includes a transmission of a transaction request by the processing component to the shared resource component.

15. A method as defined in claim 14, wherein the transaction conducted with the shared resource component includes reception of a reply to the transaction request transmitted.

16. A method as defined in claim 1, wherein the shared resource component is selected from the set consisting of an instruction (cache) memory, a data (cache) memory and an advanced computation component.

17. A method as defined in claim 1, wherein propagating the token from one processing component to another processing component along the token signal path includes causing a signal transition on a portion of the token signal path between the one processing component and another processing component.

18. A method as defined in claim 1, wherein lack of possession of the token by the given processing component prevents the given processing component from conducting a transaction with the shared resource component.

19. A circuit comprising:
   a) a plurality of processing components;
   b) a resource component shared between the plurality of processing components;
   c) a token signal path to allow propagation of a token through the processing components in the plurality of processing components, wherein possession of the token by a given processing component enables the given processing component to conduct a transaction with the shared resource component;
   d) token processing logic for:
      i. propagating the token from one processing component to an other processing component along the token signal path, wherein the propagating of the token is done at a propagation rate that is related to a transaction rate associated with the shared resource component;
      ii. generating a trigger signal at least in part based on the token, wherein said trigger signal conveys initiation of a transaction with the shared resource component;
      iii. propagating said trigger signal to the shared resource component.

20. A circuit as defined in claim 19, wherein the token processing logic propagates the token from the one processing component to another processing component along the token signal path by:
   i. determining if the one processing component desires a transaction with the shared resource component;
   ii. if the one processing component desires a transaction with the shared resource component, the token processing logic:
      (a) generates the trigger signal at least in part based on the token;
      (b) propagates said trigger signal to the shared resource component;
   iii. if the one processing component desires no transaction with the shared resource component, the token processing logic releases the token so that it is propagated along the token signal path to another processing component.

21. A circuit as defined in claim 19, wherein if the one processing component desires a transaction with the shared resource component, the token processing logic:
   (a) retains the token while the processing component initiates the transaction with the shared resource component; and
   (b) after a transaction delay time has elapsed, releases the token so that it is propagated along the token signal path to another processing component, wherein the transaction delay time is related to the transaction rate associated with the shared resource component.

22. A circuit as defined in claim 21, wherein said trigger signal is in the form of a pulse.

* * * * *